United States Patent
Bothien et al.

(10) Patent No.: US 9,429,206 B2
(45) Date of Patent: Aug. 30, 2016

(54) SENSOR MOUNTING ATTACHMENT

(71) Applicant: ALSTOM Technology Ltd, Baden (CH)

(72) Inventors: Mirko Ruben Bothien, Zürich (CH); Stephen W. Jorgensen, Palm City, FL (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 128 days.

(21) Appl. No.: 14/273,840

(22) Filed: May 9, 2014

(65) Prior Publication Data
US 2014/0346313 A1 Nov. 27, 2014

(30) Foreign Application Priority Data
May 24, 2013 (EP) .................................... 13169171

(51) Int. Cl.
*G01L 5/00* (2006.01)
*F16F 9/32* (2006.01)
*G01L 23/26* (2006.01)
*F16M 13/02* (2006.01)

(52) U.S. Cl.
CPC ................ *F16F 9/32* (2013.01); *F16M 13/02* (2013.01); *G01L 23/26* (2013.01)

(58) Field of Classification Search
USPC ...................... 248/205.1, 565, 576, 577, 578; 73/112.01, 763, 774
See application file for complete search history.

(56) References Cited

U.S. PATENT DOCUMENTS

| 5,369,952 | A | * | 12/1994 | Walters | ................... F02C 7/222 188/381 |
| 5,535,630 | A | * | 7/1996 | Miyamoto | ............ G01P 15/135 73/11.04 |
| 5,807,048 | A | * | 9/1998 | d'Agraives | ........... F16B 41/005 411/14 |
| 8,347,698 | B2 | | 1/2013 | Schleif et al. | |
| 2012/0096933 | A1 | | 4/2012 | Schleif et al. | |
| 2012/0096961 | A1 | | 4/2012 | Schleif et al. | |

FOREIGN PATENT DOCUMENTS

| DE | 20 2007 001 606 | 5/2007 |
| JP | 2012-087784 A | 5/2012 |
| JP | 2012-088309 A | 5/2012 |

OTHER PUBLICATIONS

Office Action issued on Jul. 27, 2015, by the Japanese Patent Office in corresponding Japanese Patent Application No. 2014-108057. (2 pages).

* cited by examiner

*Primary Examiner* — Steven Marsh
(74) *Attorney, Agent, or Firm* — Buchanan Ingersoll & Rooney PC

(57) ABSTRACT

A mountable attachment for positioning a sensor in an environment, like a combustion chamber of a gas turbine is disclosed. The mountable attachment includes a mounting member having a hollow elongated configuration for incorporating the sensor therewithin. The attachment further includes at least one primary resilient member disposed within the mounting member in a coordinating manner with the sensor for applying an axially outward force on the mounting member to prevent thereto from loosening from a counterpart, and providing a mounting torque for mounting the sensor at a target position within the environment. The attachment may also include additional resilient member, such as a secondary resilient member, which may in combination with the primary resilient members attain a resulting mounting force to prevent the mounting member from loosening from the counterpart.

10 Claims, 3 Drawing Sheets

SENSOR MOUNTING ATTACHMENT

CROSS-REFERENCE TO RELATED APPLICATIONS

This application claims priority to European application 13169171.9 filed May 24, 2013, the contents of which are hereby incorporated in its entirety.

TECHNICAL FIELD

The present disclosure relates to mounting attachments, and, more particularly, to a mounting attachment for mounting a sensor to an object or environment, such as, combustion chambers of gas turbines.

BACKGROUND

In many applications it is necessary to place a measuring or detecting sensor close to an inaccessible object or environment, such as, combustion chambers of gas turbines, for multiple measurement and detection of physical parameters.

More often than not, to mount the sensor in such object or environment, the sensor may primarily be adapted to a threaded plug; further the threaded plug may be positioned through a hole in the object or environment to secure the sensor appropriately in the object or environment by utilizing a suitable sensor adaptor. The threaded plug is threadably tighten against the sensor adaptor having the sensor enabling the sensor's tip to be securely communicate with the object or environment for measuring or detecting various physical parameters therewithin. The sensor is held in the position by threadably securement that applies the required mounting torque. Generally, this mounting torque is quite small, which may lead to loosening of the threaded plug form the sensor adaptor thereby loosening the sensor. To obviate such loosening of the sensor, the threaded plug is generally spot welded with the sensor adaptor inhibiting the threads to be fixed to the sensor adaptor for providing required mounting torque. FIG. 1 depicts a typical arrangement of described conventional senor placement, where the sensor is depicted by 'S,' the threaded plug is depicted by 'T,' the adaptor is depicted by 'A,' the spot weld is depicted by the 'W,' and the environment is depicted by the 'E.'

However, where the problem of loosening of the sensor may be solved by the spot welding, access and replacement of the sensor becomes cumbersome and tedious task.

Accordingly, there exists a need to secure a sensor in proper manner that may prevent the loosening thereof, and at the same time, the sensor may be easily accessible and replaceable, when required, from the object or environment, in an economical and adaptable manner.

SUMMARY

The present disclosure describes a mounting attachment for positioning a sensor in an environment, like a combustion chamber of a gas turbine, that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a mounting attachment, which may be adaptable in terms of securing a sensor in proper manner that may prevent the loosening thereof, and at the same time, the sensor may be easily accessible and replaceable, when required, from the object or environment. In other words, the object is to preclude spot welding that is conventionally required to maintain a mounting torque to secure the sensor is a position. Another object of the present disclosure is to describe a mounting attachment, which is convenient to use in an effective and economical way. Various other objects and features of the present disclosure will be apparent from the following detailed description and claims.

The above noted and other objects, in one aspect, may be achieved by a mounting attachment for positioning a sensor, such as a pulsation sensor, in an environment. Example of the environment, where such attachment may be utilized, including but not limited to, a combustion chamber of a gas turbine. While the disclosure will be described in conjunction to the combustion chamber of a gas turbine for the purpose of better understanding, the scope of the disclosure will extend to all such components where the present mounting attachment may be successfully utilized.

According to the above aspects of the present disclosure, a mounting attachment for positioning a sensor in an environment is disclosed. The mounting attachment includes a mounting member and at least one primary resilient member. The mounting member has a hollow elongated configuration for incorporating the sensor therewithin. The mounting member includes a first end portion, a second end portion and a third portion between the first and second end portions. The first end portion includes a shoulder member projecting radially inward. The second end portion includes internally configured threads to threadably screw the mounting member to a counterpart thereof within the environment, configuring the sensor to an adaptor within the environment to measure variable physical parameters within the environment. Further, the third portion having a flange member projecting radially inward. The sensor extends within the mounting member from the first end portion to the second end portion, being engaged at the shoulder member and the flange member. The at least one primary resilient member is disposed within the mounting member secularly between the shoulder member and the flange member, in a coordinating manner with the sensor. The at least one primary resilient member applies an axially outward force on the mounting member to prevent thereto from loosening from the counterpart, and providing a mounting torque for mounting the sensor at a target position within the environment.

In one embodiment the at least one primary resilient member exhibits stiffness corresponding to the mounting torque required for mounting the sensor. The at least one primary resilient member may be a helical spring.

In one embodiment, the mountable attachment may further include a sealing plate having a through recess to receive the mounting member to partially expose thereto with the environment and further for sealing the environment. Further, the mounting member may also include a flange member projecting radially outward and configured proximate to the first end portion thereof. The mountable attachment may also include at least one secondary resilient member for partially receiving the mounting member and secularly resting between the sealing plate and the flange member.

In one embodiment, the at least one secondary resilient member has a higher stiffness than the at least one primary resilient member. The at least one primary and secondary resilient members are capable of attaining a resulting mounting force to prevent thereto from loosening from the counterpart. The at least one secondary resilient member may also be a helical spring.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second," "third," "primary," "secondary" and the like, herein do not denote any order, elevation or importance, but rather are used to distinguish one element from another. Further, the terms "a" and "an" herein do not denote a limitation of quantity, but rather denote the presence of at least one of the referenced item.

Figure 1:
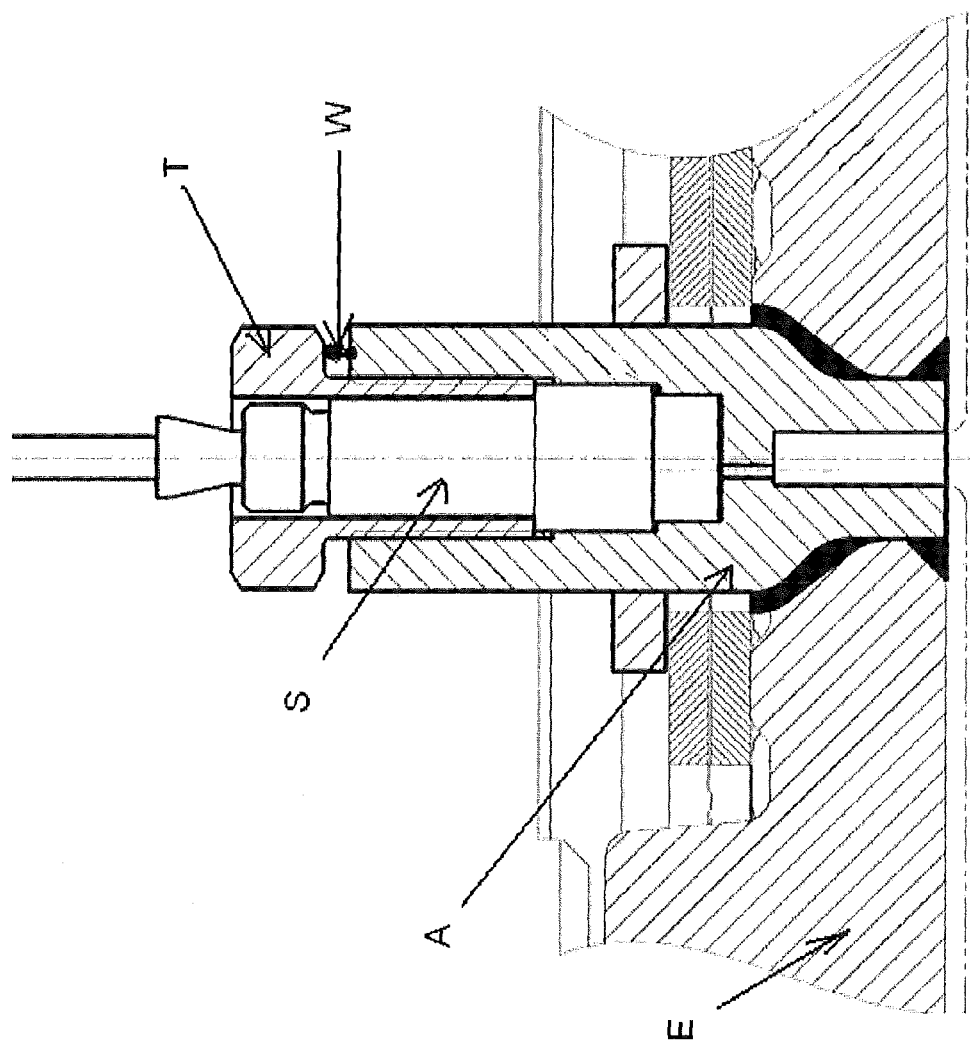
FIG. 1 illustrates a conventional arrangement for securing a sensor to an environment, such as a combustion chamber of a gas turbine.
Figure 2:
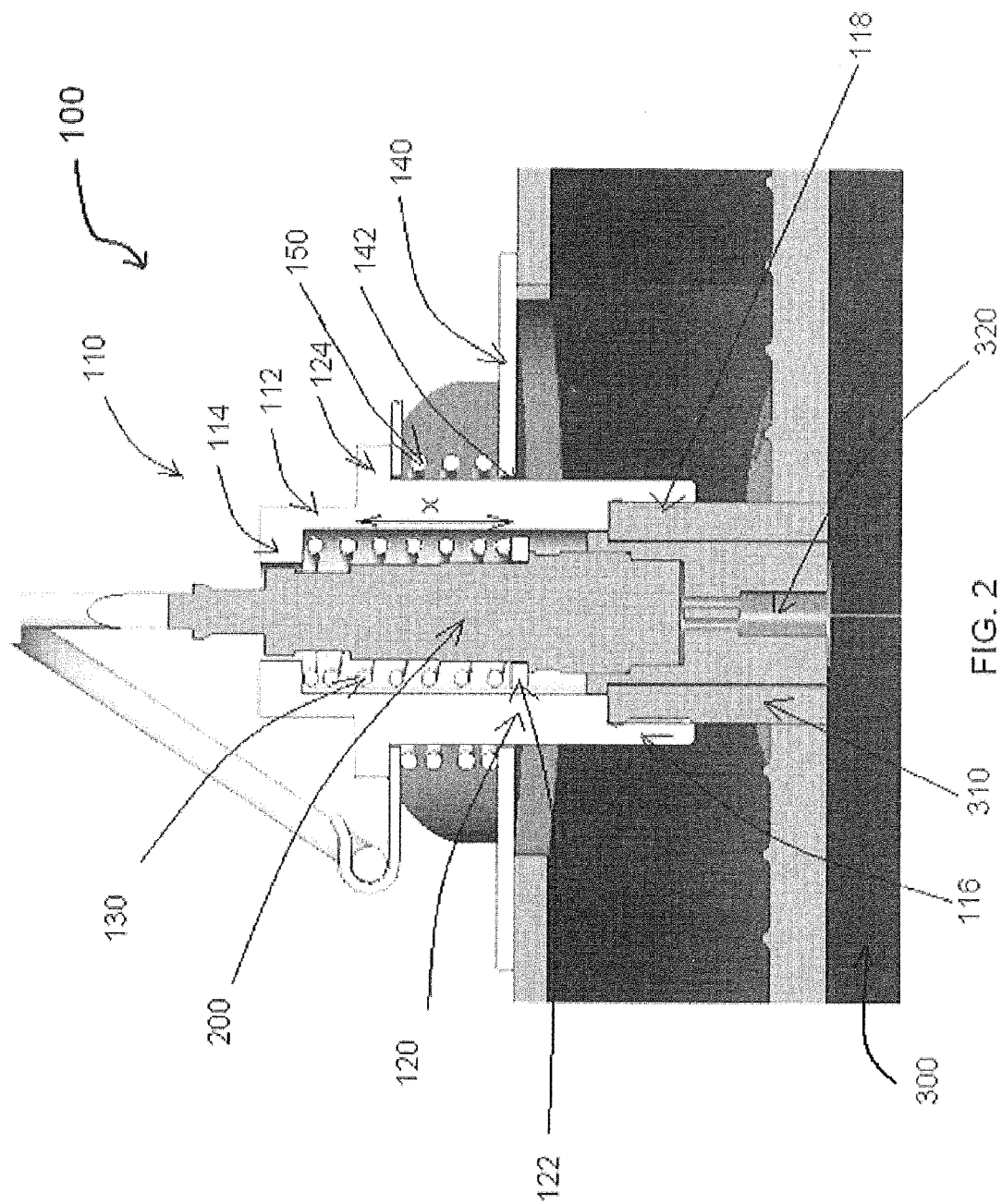
FIG. 2 illustrates a sectional front view of a mountable attachment with an environment, such as a combustion chamber of a gas turbine, in accordance with an exemplary embodiment of the present disclosure.
Figure 3:
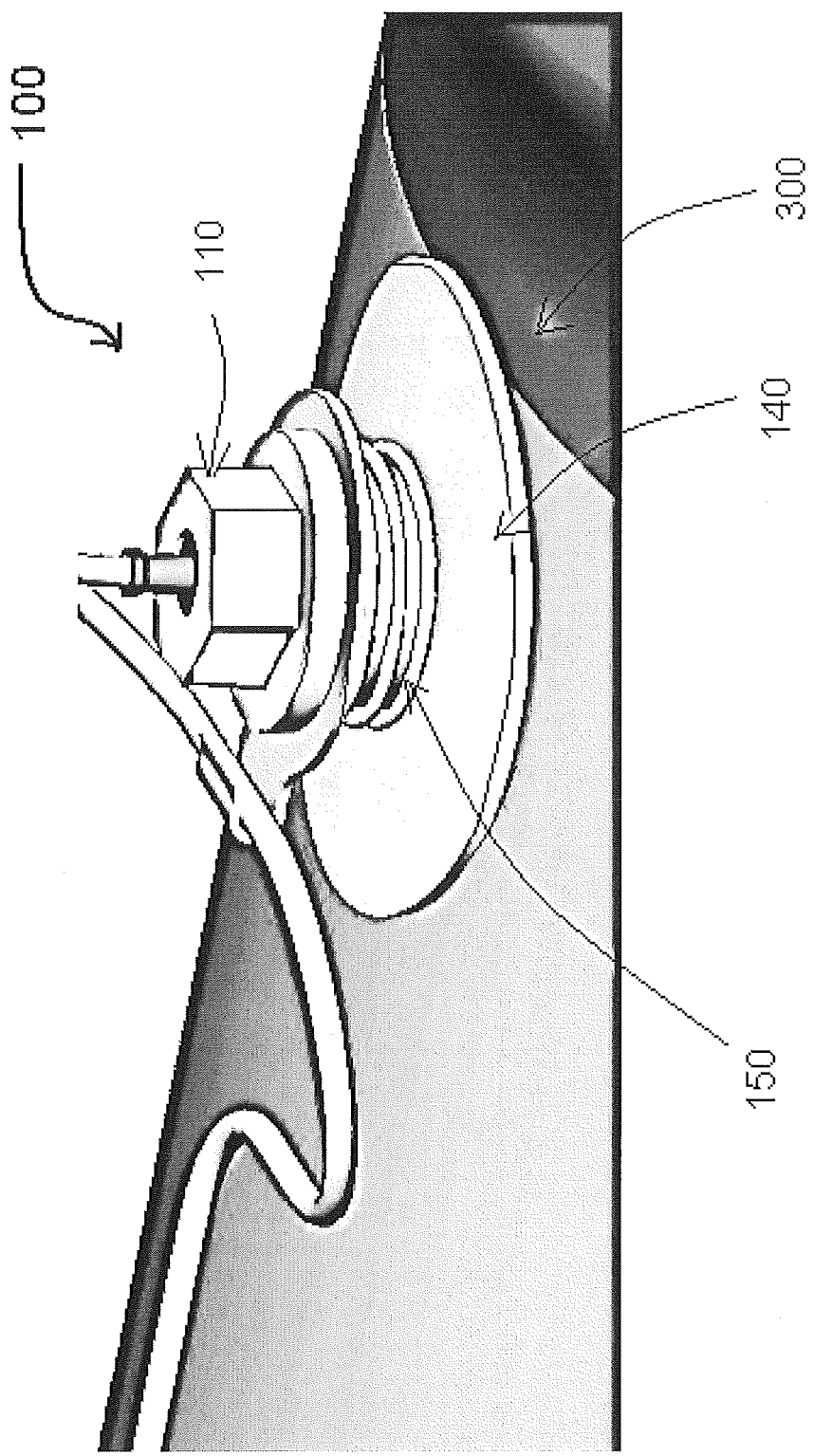
FIG. 3 illustrates a perspective view of the mountable attachment of FIG. 2, in accordance with an exemplary embodiment of the present disclosure; and Like reference numerals refer to like parts throughout the description of several views of the drawings.

Referring now to FIGS. 2 and 3, examples of a mountable attachment 100 for or positioning a sensor 200 in an environment 300, illustrated in accordance with an exemplary embodiment of the present disclosure. Example of the environment 300, where such attachment 100 may be utilized, including but not limited to, a combustion chamber of a gas turbine. While the disclosure will be described in conjunction to the combustion chamber of the gas turbine, and will be designated with number 300, for the purpose of better understanding, the scope of the disclosure will extend to all such components where the present mountable attachment 100 may be successfully utilized. In as much as the construction and arrangement of the mountable attachment 100 various associated elements may be well-known to those skilled in the art, it is not deemed necessary for purposes of acquiring an understanding of the present disclosure that there be recited herein all of the constructional details and explanation thereof Rather, it is deemed sufficient to simply note that as shown in FIGS. 2 and 3, in the mountable attachment 100, only those components are shown that are relevant for the description of various embodiments of the present disclosure.

The mountable attachment 100 includes a mounting member 110, which is hollow and is elongated, i.e. have a suitable length thereof, in its configuration. The mounting member 110 has a first end portion 112, a second end portion 116, and a third portion 120 between the first and second end portions 112 and 116. The first end portion 112 is designed to include a shoulder member 114, which projects radially inward from the first end portion 112. Further, the second end portion 116 includes internally configured threads 118 to threadably screw the mounting member 110 to a counterpart 310 thereof within the environment 300. Furthermore, the third portion 120 also includes a flange member 122, which projects radially inward from the hollow elongated mounting member 110.

The mountable attachment 100 also includes at least one primary resilient member 130, which is adapted to be disposed within the mounting member 110. As shown in FIG. 2, only one primary resilient member 130 is disposed with the mounting member 110, however, without departing from the scope of the present disclosure more than one such primary resilient member 130 may be provided depending upon the requirement of the mountable attachment 100.

The mounting member 110 and the primary resilient member 130 are adapted to secure the sensor 200 within the mountable attachment 100 for positioning the sensor 200 within the combustion chamber 300 of the gas turbine. The hollow and elongated configuration of the mounting member 110 enables incorporation of the sensor 200 therewithin. Further, the second end portion 116 that includes the internally configured threads 118, threadably screw the mounting member 110 to the counterpart 310 within the combustion chamber 300, which in turn enables configuring of the sensor 200 within the combustion chamber 300 by utilizing a suitable adaptor 320.

The sensor 200 is adapted to be configured within the hollow elongated mounting member 110 in a manner that extends within the mounting member 110 from the first end portion 112 to the second end portion 116, being engaged at the shoulder member 114 and the flange member 122. Further, the primary resilient member 130 is also secularly disposed between the shoulder member 114 and the flange member 122 within the mounting member 110, in a coordinating manner with the sensor 200. In one embodiment, there may be various primary resilient members 130, which may be arranged around the sensors 200. In another embodiment, there may be one or more primary resilient member 130 that may partially or fully encapsulate the sensor 200. However, without departing from the scope of the present disclosure, there may be various other arrangements between the primary resilient member 130 and the sensor 200. In FIG. 2, the example arrangement between the primary resilient member 130 and the sensor 200 is illustrated where the resilient member 130 is depicted to partially encapsulate the sensor 200, and will be described herein with that regard.

The primary resilient member 130 applies an axially outward force (as shown by arrow 'X' in FIG. 2) on the mounting member 110 to prevent thereto from loosening from the counterpart 310, and providing a mounting torque for mounting the sensor 200 at a target position within the combustion chamber 300. The primary resilient member 130 may exhibit stiffness corresponding to the mounting torque required for mounting the sensor 200 at the target position. No matter how tighten the mounting member 110 is screwed on its counterpart 310, the sensor 200 only gets required mounting torque defined by the stiffness of the primary resilient member 130 for placing the sensor 200 at the targeted position. The target position may a position where the sensor 200 is maintained in close coordination with the adaptor 320 or the combustion chamber 300 for measuring variable physical parameters within the combustion chamber 300.

In one embodiment, the mountable attachment 100 may also additionally include at least one secondary resilient member 150, which may in combination with the primary resilient member 130 attain a resulting mounting force to prevent thereto from loosening from the counterpart 310, in a scenario where the primary resilient member 130 may lag in any manner. The secondary resilient member 150 also applies an axially outward force (as shown by arrow 'X' in FIG. 2) for attaining the resulting mounting force to the said purpose. For configuring the secondary resilient member 150 for such balancing, the hollow elongated mounting member 100 further includes a flange member 124 projecting radially outward proximate to the first end portion 112. Further, the mountable attachment 100 also includes a sealing plate 140, which is combination with the flange member 124 secures the secondary resilient member 150. Specifically, the sealing plate 140 includes a through recess 142 to receive the hollow elongated mounting member 110 to partially expose thereto with the combustion chamber 300 and further sealing the combustion chamber 300. Further, the secondary resilient member 150 partially receives the mounting member 110 and secularly rests between the sealing plate 140 and the flange member 124. The secondary resilient member 150 has a higher stiffness than the primary resilient member 130 resulting higher torque on the threads 118 to prevent the mounting member 110 from loosening. As shown in FIGS. 2 and 3, only one secondary resilient member 150 is provided, however, without departing from the scope of the present disclosure more than one such secondary resilient member 150 may be configured depending upon the requirement.

In one embodiment, the primary resilient member 130 and the secondary resilient member 150 are helical springs, however, without departing from the scope of the present disclosure the resilient members may any other biasing member of arrangement that are capable of exhibiting required mounting torque for positioning the sensor 200 in the targeted position within the combustion chamber 300. Moreover, a suitable wiring and electronic system may be coupled to the sensor 200 for analysis of the data measured or detected by the sensor 200.

A mountable attachment, such as the mountable attachment 100, for or positioning a sensor in an environment, such as a combustion chamber of a gas turbine, of the present disclosure are advantageous in various scopes. The mounting attachment is adaptable in terms of securing the sensor in proper manner that may prevent the loosening thereof, and at the same time, the sensor may be easily accessible and replaceable, when required, from the object or environment. In other words, the mountable attachment precludes spot welding that is conventionally required to maintain a mounting torque to secure the sensor is a position. Further, the mounting attachment is capable of being mounted from outside the environment, such as an engine without the requirement of secure spot or any other weld in convenient, effective and economical way.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A sensor in combination with a mountable attachment for positioning the sensor in an environment, the environment including a combustion chamber of a gas turbine, the sensor in combination with the mountable attachment comprising:

a mounting member having a hollow elongated configuration to at least partially incorporate the sensor therewithin, the mounting member comprising:

a first end portion having a shoulder member projecting radially inward, a second end portion having internally configured threads to threadably screw the mounting member to a counterpart thereof within the environment, configuring the sensor within the environment to measure variable physical parameters within the environment, and a third portion between the first and second end portions, the third portion having a flange member projecting radially inward, wherein the sensor extends within the mounting member from the first end portion to the second end portion , being at least partially engaged at the shoulder member and the flange member; and at least one primary resilient member disposed within the mounting member between the shoulder member and the flange member in a coordinating manner with the sensor, wherein the at least one primary resilient member is capable of:

applying an axially outward force across at least the mounting member to prevent thereto from loosening from the counterpart, and providing a mounting torque for at least mounting the sensor at a target position within the environment.

2. The mountable attachment as claimed in claim 1, wherein the at least one primary resilient member exhibits stiffness corresponding to mounting torque required for mounting the sensor.

3. The mountable attachment as claimed in claim 1, wherein the at least one primary resilient member is a helical spring.

4. The mountable attachment as claimed in claim 1 further comprising a sealing plate having a through recess to receive the hollow elongated mounting member to partially expose thereto with the environment and further sealing the environment.

5. The mountable attachment as claimed in claim 4, wherein the hollow elongated mounting member further comprises a flange member projecting radially outward positioned proximate to the first end portion.

6. The mountable attachment as claimed in claim 5, further comprising at least one secondary resilient member partially receiving the mounting member and resting between the sealing plate and the flange member.

7. The mountable attachment as claimed in claim 6, wherein the at least one secondary resilient member has a higher stiffness than the at least one primary resilient member.

8. The mountable attachment as claimed in claim 7, wherein the at least one primary and secondary resilient members attain a resulting mounting force to prevent loosening.

9. The mountable attachment as claimed in claim 6, wherein the at least one secondary resilient member is a helical spring.

10. The mountable attachment as claimed in claim 1, wherein the sensor is configured to the environment via an adaptor.

* * * * *